US009269067B2

(12) United States Patent
Anderson

(10) Patent No.: US 9,269,067 B2
(45) Date of Patent: Feb. 23, 2016

(54) METHOD AND APPARATUS FOR PROVIDING SELECTIVE ACCESS TO INFORMATION

(75) Inventor: Scott William Anderson, Palm Beach Garden, FL (US)

(73) Assignee: Altisource Solutions S.À.R.L., Luxembourg (LU)

( * ) Notice: Subject to any disclaimer, the term of this patent is extended or adjusted under 35 U.S.C. 154(b) by 2170 days.

(21) Appl. No.: 10/408,079

(22) Filed: Apr. 4, 2003

(65) Prior Publication Data
US 2004/0024763 A1 Feb. 5, 2004

Related U.S. Application Data

(60) Provisional application No. 60/369,722, filed on Apr. 4, 2002.

(51) Int. Cl.
 *G06F 7/00* (2006.01)
 *G06F 17/30* (2006.01)
 *G06Q 10/10* (2012.01)

(52) U.S. Cl.
 CPC .......... *G06Q 10/10* (2013.01); *G06F 17/30029* (2013.01)

(58) Field of Classification Search
 USPC ........ 707/4, 6, 8, 9, 783–785, 787; 705/1, 80, 705/14.18
 See application file for complete search history.

(56) References Cited

U.S. PATENT DOCUMENTS

| 5,555,403 A | | 9/1996 | Cambot et al. ............. 395/600 |
|---|---|---|---|
| 5,721,903 A | * | 2/1998 | Anand et al. ................. 707/5 |
| 5,819,271 A | * | 10/1998 | Mahoney et al. |
| 5,864,683 A | | 1/1999 | Boebert et al. ........... 395/200.79 |
| 5,892,900 A | | 4/1999 | Ginter et al. .................. 395/186 |
| 6,072,493 A | * | 6/2000 | Driskell et al. ............... 715/854 |
| 6,112,181 A | | 8/2000 | Shear et al. ...................... 705/1 |
| 6,138,119 A | | 10/2000 | Hall et al. ........................ 707/9 |
| 6,341,292 B1 | * | 1/2002 | Cho et al. ..................... 707/203 |
| 6,427,140 B1 | * | 7/2002 | Ginter et al. .................... 705/80 |
| 6,453,353 B1 | * | 9/2002 | Win et al. ..................... 709/229 |
| 6,516,315 B1 | * | 2/2003 | Gupta ............................ 707/9 |
| 6,606,711 B2 | | 8/2003 | Andrews et al. ............. 713/201 |
| 6,609,123 B1 | | 8/2003 | Cazemier et al. ................ 707/4 |
| 6,615,258 B1 | * | 9/2003 | Barry et al. .................. 709/223 |
| 6,859,805 B1 | * | 2/2005 | Rogers et al. .................... 707/9 |
| 6,941,271 B1 | * | 9/2005 | Soong .............................. 705/3 |
| 7,406,425 B1 | * | 7/2008 | Frank et al. .................. 705/310 |
| 7,421,442 B2 | * | 9/2008 | Gelb et al. |
| 2003/0014270 A1 | * | 1/2003 | Qureshi et al. .................... 705/1 |
| 2006/0074793 A1 | * | 4/2006 | Hibbert et al. .................. 705/38 |

\* cited by examiner

*Primary Examiner* — Uyen Le
(74) *Attorney, Agent, or Firm* — Meunier Carlin & Curfman LLC

(57) ABSTRACT

A reporting system provides users selective access to information, such as standard reports, custom reports, and ad hoc reports. Reports are represented as report objects that store characteristics that must be fulfilled prior to a user being granted access to a report. Upon a user request for a specific report, the characteristics of the user are compared with the characteristics stored in the corresponding report object. If the user characteristics match the report object, then the user is granted access to the corresponding report. If the user characteristics do not match the report object, then the user is denied access to the corresponding report. Accordingly, access to a report is verified twice, once upon presenting an indication of the available reports to the user and again when a selected report is accessed. Preferably, the reporting system comprises a report server connected to a network, such as the Internet.

20 Claims, 16 Drawing Sheets

Fig. 20

|   | A | B | C | D | E | F | G | H |
|---|---|---|---|---|---|---|---|---|
| 1 | Inv_ name | | | | | | | |
| 2 | Date | | 'Remittance Report' | | | | | |
| 3 | | | | | | | | |
| 4 | | 'Number Loans' | Count | | | | | |
| 5 | | | | | 'Beginning Balance" | Sum(curr_prin_bal) | | |
| 6 | | 'Total UPB' | Sum(curr_prin_bal) | | 'Ending Balance' | Sum(curr_prin_bal) | | |
| 7 | | | | | | | | |
| 8 | | | | | | | | |

Fig. 21

MSDW 1993-
01-Mar-2003              Remittance Report
    Number Loans    10
                                              Beginning Balance $10,000.00
        Total UPB    $20,000.00    Ending Balance    $ 9,000.00

METHOD AND APPARATUS FOR PROVIDING SELECTIVE ACCESS TO INFORMATION

CROSS-REFERENCE TO RELATED APPLICATION

This application claims the benefit of U.S. provisional patent application No. 60/369,722 filed Apr. 4, 2002.

TECHNICAL FIELD

The invention relates generally to providing selective access to information and, more particularly, to a method and apparatus for providing selective access to specific reports and specific data fields.

BACKGROUND

Many reporting systems, particularly investor reporting systems, restrict access to specific reports and other types of information to specific individuals, organizations, or types of individuals or organizations. Furthermore, it is often desirable to restrict access to specific information to a specific timeframe, such as restricting access to information regarding a transaction until after closing or after the transaction has been audited.

Existing reporting systems, such as BusinessObjects software available from Business Objects SA, however, generally do not provide the level of security often required for providing selective access to information. Generally, the BusinessObjects software provides reporting capabilities for Internet web-sites. The BusinessObjects software executes a structured query language (SQL) query against a database and creates an object that may be displayed via a hyper-text markup language (HTML) document. The BusinessObjects software, however, does not provide any mechanism to apply a set of security rules. The BusinessObjects software assumes that the user has access to the information extracted from the database by the SQL query.

Other systems, such as the CrystalReports software available from Crystal Decisions, provide only a file level of security. Generally, the Seagate software provides a mechanism to apply security rules only on the file level, not the query level. For example, the Seagate software enables an administrator to manually indicate that only a specific individual may access a particular file. If the access privileges for the file change, then the administrator must manually alter the access privileges for the file. Accordingly, the Seagate software does not provide an efficient method of providing selective access to a large number of files, particularly when the access privilege to the files may change based on certain events. Other software includes Impromptu from Cognos, Incorporated and Oracle Discovers from Oracle Corporation.

The shortcomings discussed above are apparent in web-based services where an individual can access a file directly. It is common practice to implement a naming scheme to manage the large volume of reports made available to users of a web site. If an unauthorized individual determines the naming scheme used to manage the reports, however, that individual may enter the file name as part of the HTML address to gain direct access to that file, thereby circumventing the security procedures.

Therefore, there is a need for a reporting system that provides selective access to various reports dependent upon the characteristics of the user and the characteristics of the data. Moreover, there is a need for a reporting system that allows a user to create a template for a report to be created against various databases.

SUMMARY

It is an object of the present invention to provide a reporting system for providing a user selective access to information. Access to the information is verified upon presentation of the available information and upon retrieval of the information.

It is another object of the present invention to provide a reporting system that verifies access to information dependent upon the characteristics of the data and the characteristics of the user.

In accordance with one aspect of the present invention, a set of information to which the user has been granted access is presented to the user. The user selects the desired information. The reporting system revalidates that the user is granted access to the desired information.

In yet another embodiment of the present invention, access to information is dependent upon the involvement of the user regarding the basis for the requested information, the role played by the user in the requested information, period restrictions placed upon the requested information, attribute security restrictions placed upon the requested information, or attribute period restrictions.

In yet another embodiment of the present invention, the information relates to standard reports that have been created for various types of users and for various transactions.

In yet another embodiment of the present invention, the information relates to specific attributes that have been selected by the user.

BRIEF DESCRIPTION OF THE DRAWINGS

For a more complete understanding of the present invention, and the advantages thereof, reference is now made to the following descriptions taken in conjunction with the accompanying drawings, in which:

FIG. 20 is a spreadsheet that may be used to generate a report in accordance with one embodiment of the present invention; and FIG. 21 is a report that may be generated from a spreadsheet illustrated in FIG. 20 in accordance with one embodiment of the present invention.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning computer networking, software programming, telecommunications, and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Furthermore, the processing depicted in the figures and described below is generally depicted as a hierarchical structure for readability and understandability. Other methodologies, particularly object-oriented techniques, are preferred for the physical embodiment of the invention in order to maximize the use of existing tools and programming techniques. One of ordinary skill in the art will realize that the techniques described herein may be embodied in many different forms.

For illustrative purposes only, the following discussion illustrates and discusses the present invention in reference to an embodiment in which the present invention is utilized to provide selective access to investor reports. One of ordinary skill in the art, however, will appreciate that the present invention may be utilized to provide selective access to many reports, systems, information, tools, and the like.

Figure 1:
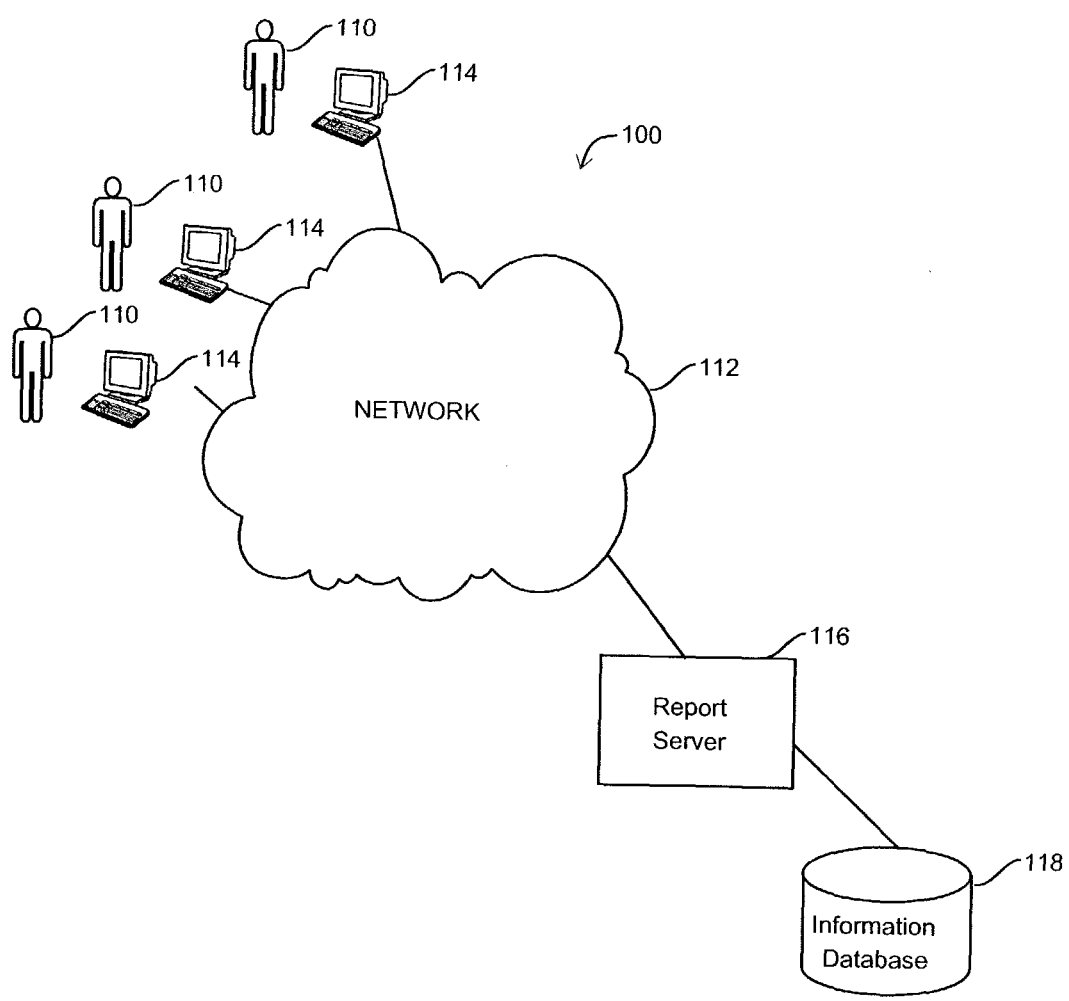
FIG. 1 schematically depicts a network environment that embodies one embodiment of the present invention.

Referring to FIG. 1 of the drawings, the reference numeral 100 generally designates a reporting system embodying features of the present invention. The reporting system 100 generally comprises a user 110 accessing a network 112, such as the Internet, a local-area network (LAN), wide-area network (WAN), or the like, via an access device 114, such as a workstation, cell phone, personal data assistant (PDA), or the like. Preferably, the access device 114 is configured to provide a text and graphic display on which the user 110 may view information. Furthermore, the access device 114 is configured to receive information from and transmit information to the network 112. Preferably, the access device 114 is connected to the network 112 via a technology such as wire line, wireless, fiber optics, or the like.

A report server 116 is configured to connect to the network 112 to transmit information to and receive information from the network 112. Preferably, the report server 116 comprises a standard web-server designed to connect to the Internet and provide information to remotely connected users, such as user 110, via the Internet. Additionally, the report server 116 is configured to access an information database 118. Preferably, the information database 118 is a stand-alone database server that provides a large quantity of storage. Smaller systems, however, may incorporate the report server 116 and the information database 118 into a single component. Furthermore, while the report server 116 is illustrated as a single component for illustrative purposes, the report server 116 may comprise a plurality of servers networked together to provide access to a greater number of users. Preferably, the report server 116 is connected to the network 112 via a technology such as wire line, wireless, fiber optics, or the like.

In the preferred embodiment, the information database 118 comprises a relational database that allows a query written in standard SQL to extract information. Suitable relational databases include Oracle available from Oracle Corporation, Informix available from International Business Machines Corporation, Sybase available from Sybase, Incorporated, or the like. Furthermore, commercially available tools are generally available to extract information from the relational databases and to generate reports. Suitable report generating tools include CrystalReports available from Crystal Decisions, BusinessObjects available from Business Objects SA, and the like.

Additionally, the connection formed between the access device 114 and the report server 116 via the network 112 is configured to utilize secure transmission techniques to prevent unauthorized users connected to the network 112 from intercepting and viewing the information. Additionally, the report server 116 is configured to prevent unauthorized access.

Figure 2:
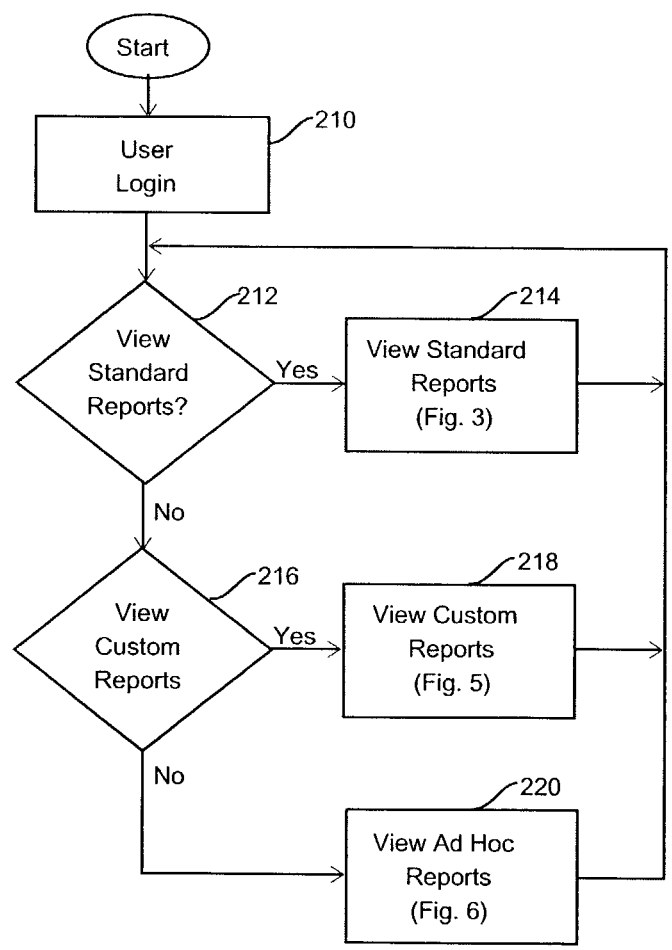
FIG. 2 is a data flow diagram depicting steps that may be performed to provide selective access to reports in accordance with one embodiment of the present invention.

FIG. 2 is a data flow diagram depicting the steps performed by the report server 116 in accordance with an embodiment of the present invention. Processing begins in step 210, wherein a user login is received by the report server 116. Preferably, each user 110 is assigned a unique user id and password for gaining access to the report server 116 and, thus, access to information stored in the information database 118. Optionally, a user id and password may be assigned to a group of individuals or an organization. For example, a brokerage company may be assigned a user id and password for use by all employees of the brokerage company.

Processing proceeds to step 212 wherein a determination is made whether or not the user has selected to view a standard report. Generally, standard reports contain predetermined information in a predetermined format suitable for many users. The reporting system 100 maintains standard reports automatically prepared for a user to view, reducing the demand on the report server 116 and the information database 118. Preferably, a standard report is created for each type of report and for each type of user, such as a trustee user, an investor user, a service agency user, a rating agency user, a broker user, and the like. For example, in the area of investor reporting, standard reports may include performance reports, stratification reports, trustee reports, deal reports, and the like. If the reporting system supports three types of users, then three reports are preferably created for each type of report. Alternatively, the reporting system 100 may only create selective reports for each user. This alternative embodiment is particularly useful in systems in which some reports are not useful to some types of users.

Referring back to FIG. 2, if a determination is made in step 212 that the user has selected to view standard reports, then processing proceeds to step 214, wherein the user 110 is allowed to view the standard reports to which the user is allowed access. The details of step 214 are discussed in greater detail below with reference to FIG. 3.

If, in step 212, a determination is made that the user has not selected to view standard reports, then processing proceeds to step 216, wherein a determination is made whether or not the user 110 selected to view custom reports. Custom reports allow the user to modify or filter the standard reports, or to restrict the standard report to a specific transaction or portfolio (i.e., a group of transactions). For example, a user may choose to restrict a performance report to a group of 20 specific transactions. Moreover, the user may wish to restrict the performance report to transactions with an interest rate greater than a specific amount. Accordingly, the report system 100 preferably allows the user to select a standard report, specify a transaction or portfolio, and specify a filter with respect to one or more attributes contained in the report.

If, in step 216, a determination is made that the user selected to view custom reports, then processing proceeds to step 218, wherein the user 110 is allowed to define and view a custom report. The details of step 218 are discussed in greater detail below with reference to FIG. 5.

If, in step 216, a determination is made that the user selected not to view custom reports, then processing proceeds to step 220, wherein the user 110 is allowed to define and view an ad hoc report. Ad hoc reports provide specific information as requested by the user. Preferably, the user is able to select attributes from among a list of available attributes and to select a transaction portfolio from which the user wishes to extract the information. Additionally, the user is preferably able to identify filters for specific attributes, such as specifying that the interest rate must be greater than a specified value. The details of step 220 are discussed in greater detail below with reference to FIG. 6.

Figure 3:
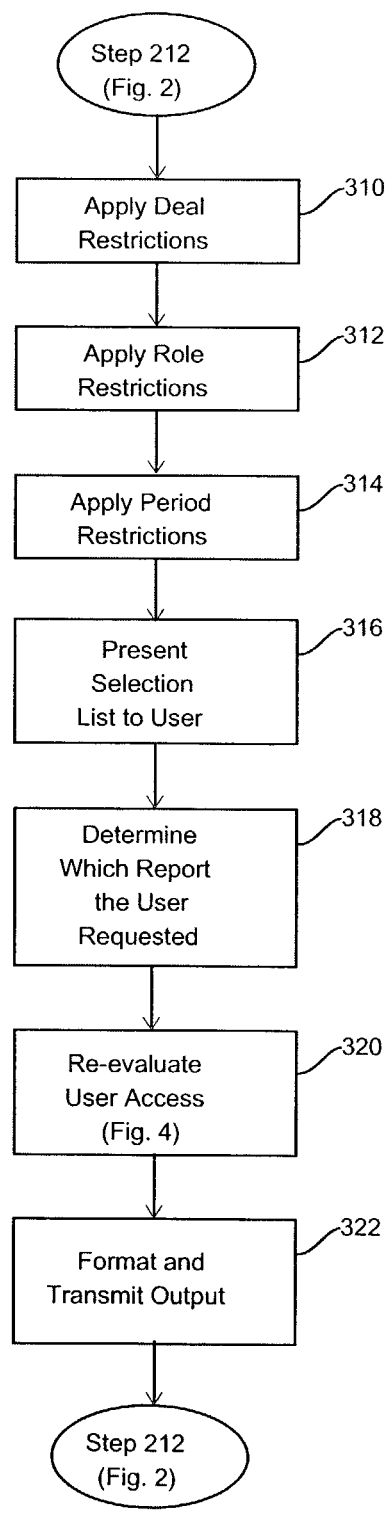
FIG. 3 is a data flow diagram depicting steps that may be performed to present a standard report to a user in accordance with one embodiment of the present invention.

FIG. 3 is a data flow diagram depicting the steps for viewing a standard report in accordance with one embodiment of the present invention. Specifically, FIG. 3 is a data flow diagram depicting the steps for viewing a standard report as described above with reference to step 214 of FIG. 2. Accordingly, upon making a determination in step 212 that the user has selected to view a standard report, processing proceeds to step 214, the details of which are depicted by steps 310-322 of FIG. 3.

Processing begins in step 310, wherein the deal restrictions are applied, i.e., the transactions or portfolios in which the user 110 is involved is determined. Generally, as will be discussed in greater detail below with reference to FIG. 8, a set of standard reports is created for each transaction or portfolio and for each role of a user in the transaction or portfolio. The user 110 is then granted access to the standard reports for the transaction or portfolio the user 110 is involved and for the specific role of the user 110 in the corresponding transaction or portfolio.

Referring back to FIG. 3, the user 110 is preferably granted access to standard reports regarding transactions or portfolios in which the user 110 is involved. Accordingly, step 310 performs a query on the information database 118 to determine the transactions or portfolios in which the investor is involved.

Next, in step 312, the role restrictions are applied, i.e., the reports generated for the specific role of the user 110 in each of the transactions or portfolios identified in step 310 is determined. Preferably, access to a standard report by the user 110 is dependent upon the role the user 110 in each particular transaction. For example, a investor user involved in a first transaction may have access to account balance information. A trustee user involved in the same first transaction, however, may not have access to account balance information. Accordingly, a performance report for an investor user may contain account balance information, whereas a performance report for a trustee user may not contain account balance information. Thus, in step 312 a query is performed to determine the role of the user 110 in each transaction. The user 110 is then only allowed access to the standard reports created specifically for the role of the user 110 in each transaction.

Next, in step 314, the period restrictions are applied, i.e., the standard reports in which predetermined date restrictions are fulfilled are determined. Preferably, the reporting system 100 allows an administrator of the reporting system 100 to specify that specific reports are only accessible by a specific type of user, such as a trustee user, an investor user, a service agency user, a rating agency user, a broker user, and the like, after a predetermined date. Accordingly, for each standard report, a date is stored for each type of user 110, wherein users of the corresponding type of user are allowed access to the associated standard report after the specified date. For example, a first standard report may indicate that users that are investors are granted access to a first standard report on March $23^{rd}$ and that users that are trustees are granted access to the same first standard report on March $25^{th}$. Optionally, restrictions may be applied after a predetermined event, predetermined timeframe, or the like.

In step 316, the user is preferably presented a list of standard reports to which the user 110 has been granted access. Preferably, the reporting system 100 presents the list of standard reports to which the user has been granted access as a hyperlink to an associated file. In step 318, the standard report selected by the user is determined.

In step 320, access to the selected standard report is re-evaluated. In the preferred embodiment, the user 110 gains access to the standard reports via the Internet. As is common among web-sites, it is possible to bypass screens and security checks by directly entering an address of the desired report. Accordingly, it is preferred that access by the user be reevaluated upon file access. Preferably, a report object is created for each report or query using standard object-oriented design and programming techniques. Generally, a report is represented by an instantiation of a report object. The report object contains attributes and other objects. The attributes of the report object represent characteristics, such as deal restrictions, role restrictions, period restrictions, and the like, that must be fulfilled before access is granted to a user. In this manner, whether or not a user is granted access to a report is easily determined by examining the report object associated with the specific report.

Upon clicking on the hyperlink associated with a desired standard report, a data link library (DLL) routine is invoked. The DLL preferably invokes a procedure to validate that the user has access to the specified standard report by comparing the report object with characteristics associated with the user and the requested report. The steps for validating that the user has access to the specified standard report is described in greater detail below with reference to FIG. 4.

Next, in step 322, the selected standard report is formatted and transmitted to the user. Preferably, the type of output generated by the reporting system 100 varies depending on the attributes. For example, output may be presented as tabular data, graphical data, or a combination thereof Furthermore, the output is preferably formatted in accordance with the type of data the output represents, such as monetary symbols, percentages, fractions, and dates. Thereafter, the processing proceeds to step 212 of FIG. 2.

Figure 4:
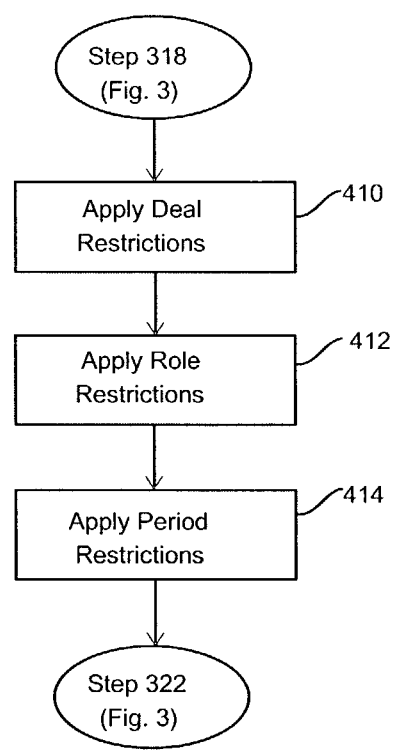
FIG. 4 is a data flow diagram depicting steps that may be performed to determine whether or not a user is to be granted access to a standard report in accordance with one embodiment of the present invention.

FIG. 4 is a data flow diagram depicting the steps for validating that a user has access to a specific standard report in accordance with one embodiment of the present invention. Specifically, FIG. 4 is a data flow diagram depicting the steps for determining which standard reports a user can view as described above with reference to step 320 of FIG. 3. Accordingly, after determining the standard report that the user selected in step 318, processing proceeds to step 320 of FIG. 3, the details of which are depicted by steps 410-414 of FIG. 4.

Processing begins in step 410, wherein deal restrictions are applied. Preferably, the user 110 is granted access to standard reports regarding transactions or portfolios in which the user 110 is involved. Accordingly, step 410 performs a query on the information database 118 to validate that the user is involved in the transaction or portfolio to which the standard report is associated.

Next, in step 412, role restrictions are applied. As discussed above, access to a standard report by the user 110 is preferably dependent upon the role of the user 110 in each particular transaction. Accordingly, before a user is granted access to any standard report, a query is performed to validate that the role for which the standard report was created matches the role of the user in the associated transaction or portfolio.

Next, in step 414, period restrictions are applied. As discussed above, access to a standard report by a user is restricted to specific time periods. Accordingly, a query is performed on the information database to verify the standard report selected by the user may be viewed on the current date. Thereafter, processing returns to step 322 of FIG. 3.

Figure 5:
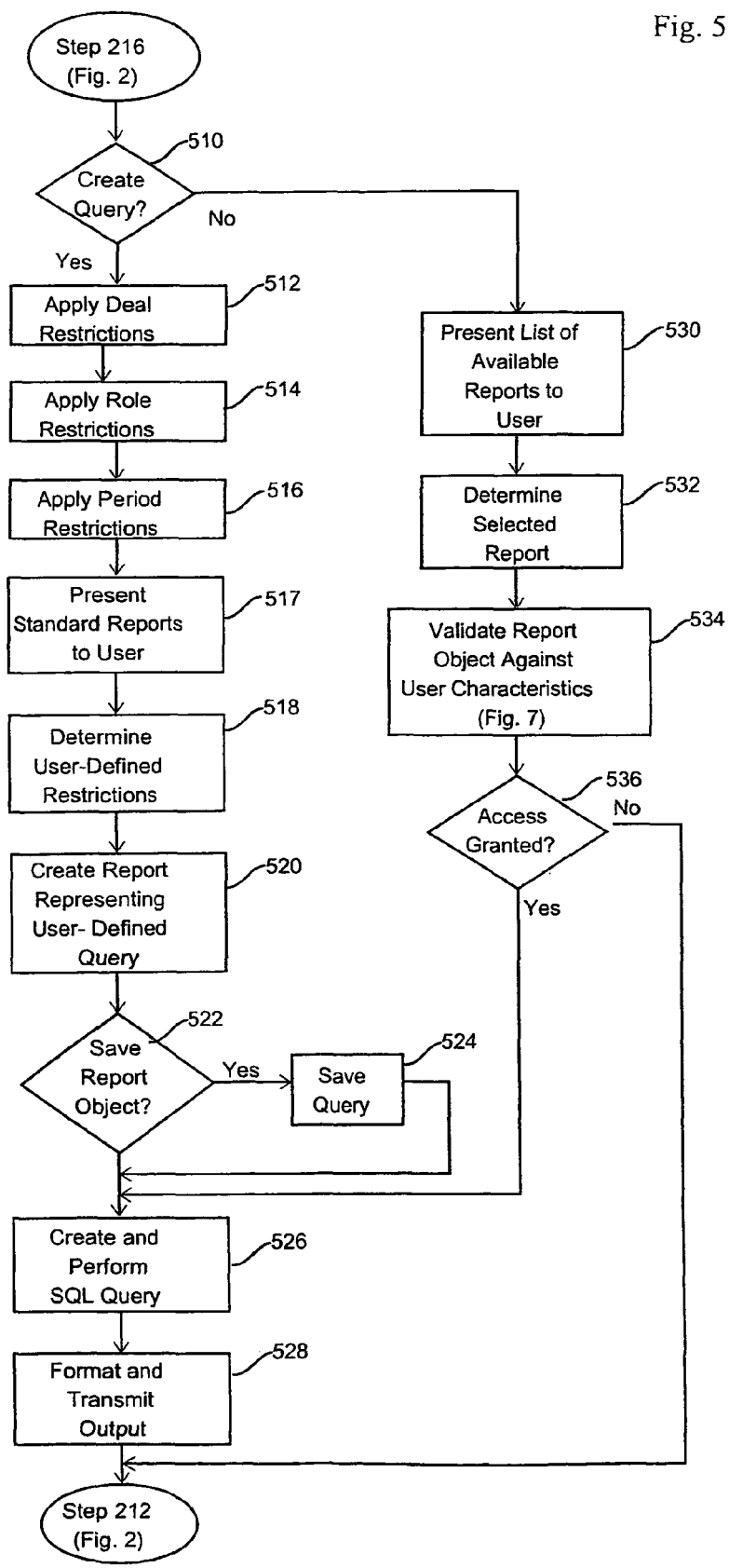
FIG. 5 is a data flow diagram depicting steps that may be performed to present a custom report to a user in accordance with one embodiment of the present invention.

FIG. 5 is a data flow diagram depicting the steps for viewing custom reports in accordance with one embodiment of the present invention. Specifically, FIG. 5 is a data flow diagram depicting the steps for viewing custom reports as described above with reference to step 218 of FIG. 2. Accordingly, upon making a determination in step 216 that the user wishes to view a custom report, processing proceeds to step 218 of FIG. 2, the details of which are depicted by steps 510-536 of FIG. 5.

Processing begins in step 510, wherein a determination is made whether or not the user 110 wishes to create a query. Preferably, the reporting system 100 enables the user 110 to create and save queries for use at a later time. Accordingly, in step 510 a determination is made to determine whether the user 110 wishes to create a new query or to execute an existing query.

If a determination is made that the user wishes to create a new query, processing proceeds to step 512, wherein a list of transactions or portfolios in which the user is involved is presented to the user. Preferably, step 512 performs a query on the information database 118 to extract a report of all transactions or portfolios to which the investor is involved.

Next, in step 514, the role restrictions are applied, i.e., the reports generated for the specific role of the user 110 in each of the transactions or portfolios identified in step 512 is determined. As discussed above, access to a standard report by the user 110 is preferably dependent upon the role of the user 110 in each particular transaction. Thus, before a standard report may be chosen by a user as a template for creating a custom report, it is preferable that a list of standard reports to which the user is granted access be presented to the user.

Next, in step 516, the period restrictions are applied, i.e., the standard reports in which predetermined date restrictions are fulfilled are determined. As discussed above, the reporting system 100 preferably allows an administrator of the reporting system 100 to specify that specific reports are only accessible by a specific type of user, such as a trustee user, an investor user, a service agency user, a rating agency user, a broker user, and the like, after a predetermined date. Accordingly, for each standard report, a date is stored for each type of user 10, wherein users of the corresponding type of user are allowed access to the associated standard report after the specified date. For example, a first standard report may indicate that users that are investors are granted access to a first standard report on March $23^{rd}$ and that users that are trustees are granted access to the same first standard report on March $25^{th}$. Optionally, restrictions may be applied after a predetermined event, predetermined timeframe, or the like.

In step 517, the user is preferably presented a list of standard reports to which the user 110 has been granted access. Preferably, the reporting system 100 presents to the user 110 a list of standard reports from which the user may select the desired report via a checkbox, clicking, voice commands, keyboard entry, or the like, from which the user may create a custom report.

Next, in step 518, the user-defined restrictions are determined. Preferably, the user 110 is presented a list of available attributes from which the user 110 is able to specify restrictions. The available attributes are the attributes contained on the standard report selected by the user 110. For each attribute, the user 110 is given the option of identifying one or more restrictions. For example, if the user 110 requires an investment report on a specific portfolio for all transactions in which the interest rate is greater than a predetermined value, the user 110 is able to select the portfolio and specify that the attribute interest rate must be greater than the predetermined value. Moreover, the user 110 may specify that the interest rate must be greater than a first value, but less than a second value.

In step 520, a report object is created. Preferably, a report object is created for each report or query using standard object-oriented design and programming techniques. Generally, a report is represented by an instantiation of a report object. The report object contains attributes and other objects. The attributes of the report object represent characteristics, such as deal restrictions, role restrictions, period restrictions, and the like, that must be fulfilled before access is granted to a user. In this manner, whether or not a user is granted access to a report is easily determined by examining the report object associated with the specific report.

Processing proceeds to step 522, wherein a determination is made whether or not the user 110 desires to save the report object for later use. As discussed above, the reporting system 100 enables a user 110 to create and save a query, i.e., the report object, for use at a later time, for purposes such as rerunning the query, editing the query, and the like. If a determination is made that the user 110 desires to save the report object, then processing proceeds to step 524, wherein the report object is saved for later use.

If a determination is made in step 522 that the user does not wish to save the query or after step 524, processing proceeds to step 526, wherein a query is formatted in accordance with the report object. As discussed above, the information database is preferably a relational database configured to provide query access via standard SQL queries. Accordingly, in step 526, the report object is translated to an SQL query and the SQL query is performed against the information database 118.

Next, in step 528, the results of the SQL query is formatted and transmitted to the user 110. Formatting and transmitting the output is discussed above with reference to step 322 of FIG. 3.

If in step 510, a determination is made that the user does not wish to create a new query, i.e., the user wishes to run an existing query, then processing proceeds to step 530. A list of saved queries is preferably presented to the user 110 to allow the user to select the desired query. After a saved query is selected in step 532, authorization to access the query is verified in step 534. As discussed above, the query is preferably stored as a report object. In step 534, the values of the attributes of the report object are compared to the characteristics of the user. The details of step 534 are discussed in further detail below with reference to FIG. 7.

In step 536, a determination is made whether or not the user is allowed access to the report object selected by the user 110. If a determination is made that the user 110 is granted access to the report object selected by the user 110, then processing proceeds to steps 526 and 528, which are described in greater detail above.

If in step 536, a determination is made that the user 110 is not allowed access to the report object selected by the user 110, then access is denied and processing returns to step 212 of FIG. 2.

Figure 6:
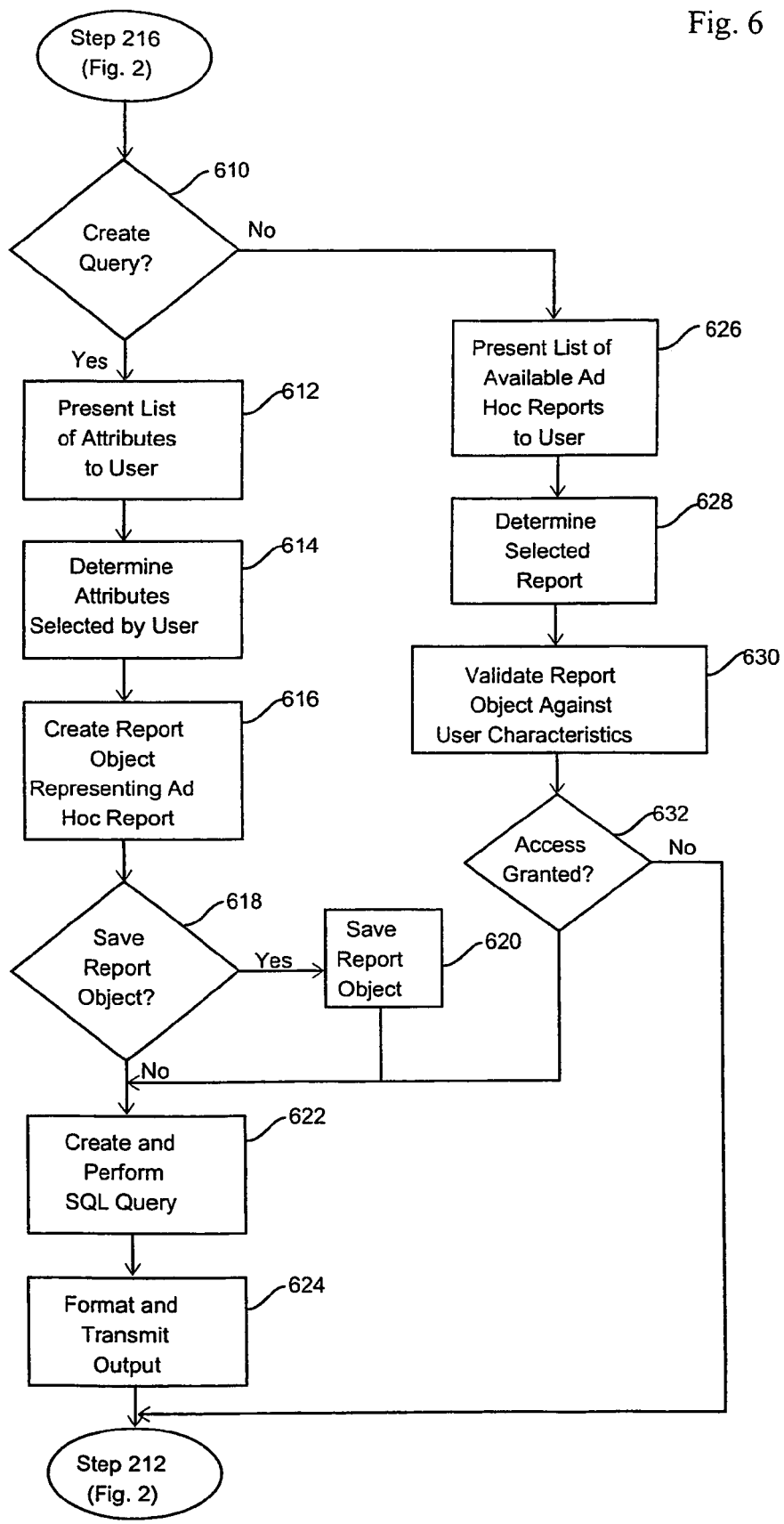
FIG. 6 is a data flow diagram depicting steps that may be performed to present an ad hoc report to a user in accordance with one embodiment of the present invention.

FIG. 6 is a data flow diagram depicting the steps for viewing custom reports in accordance with one embodiment of the present invention. Specifically, FIG. 6 is a data flow diagram depicting the steps for viewing ad hoc reports as described above with reference to step 220 of FIG. 2. Accordingly, upon making a determination in step 216 that the user 110 does not wish to view a custom report (i.e., the user 110 wishes to view an ad hoc report), processing proceeds to step 220 of FIG. 2, the details of which are depicted by steps 610-632 of FIG. 6.

Processing begins in step 610, wherein a determination is made whether or not the user 110 wishes to create an ad hoc query. Preferably, the reporting system 100 enables the user 110 to create and save ad hoc queries for use at a later time. Accordingly, in step 610 a determination is made to determine whether the user 110 wishes to create a new ad hoc query or to execute an existing ad hoc query. If a determination is made that the user 110 wishes to create a new ad hoc query, processing proceeds to step 612, wherein a list of available attributes is presented to the user 110. Preferably, the user 110 creates an ad hoc query for a specified transaction or portfolio. Accordingly, the user 110 is preferably presented a list of attributes to which the user 110 is allowed access for a transaction or portfolio selected by the user 110. Alternatively, the user 110 is presented a list of every attribute, regardless of whether the user 110 is allowed access to each attribute. The user 110 selects the attributes of interest, but only the values of the attributes to which the user 110 is allowed access is placed on the report presented to the user 110.

Next, in step 614, the attributes selected by the user 110 are determined. In step 616, a report object is created. Preferably, each report or query has a report object created using standard object-oriented design and programming techniques. Generally, attributes associated with the access profiles are represented by attributes of the report object. In this manner, whether or not a user is granted access to a report is easily determined by examining the report object associated with the specific report.

Processing proceeds to step 618, wherein a determination is made whether or not the user 110 desires to save the report object for later use. As discussed above, the reporting system 100 enables a user 110 to create and save a query, i.e., the report object, for use at a later time, for purposes such as rerunning the query, editing the query, and the like. If a determination is made that the user 110 desires to save the report object, then processing proceeds to step 620, wherein the report object is saved for later use.

If a determination is made in step 618 that the user does not wish to save the query or after step 620, processing proceeds to step 622, wherein a query is formatted in accordance with the report object. As discussed above, the information database is preferably a relational database configured to provide query access via standard SQL queries. Accordingly, in step 622, an SQL query is formatted in accordance with the value of the attributes of the report object.

Next, in step 624, the results of the SQL query is formatted and transmitted to the user 110. Formatting and transmitting the output is discussed above with reference to step 316 of FIG. 3.

If, in step 610, a determination is made that the user does not wish to create a new query, i.e., the user wishes to run an existing query, then processing proceeds to step 626. A list of saved ad hoc queries is preferably presented to the user 110 to allow the user to select the desired ad hoc query. After a saved ad hoc query is selected in step 628, authorization to access the ad hoc query is verified in step 630. As discussed above, the ad hoc query is preferably stored as a report object. In step 630, the values of the attributes of the report object are compared to the characteristics of the user. The details of step 630 are discussed in greater detail below with reference to FIG. 7.

In step 632, a determination is made whether or not the user is allowed access to the report object selected by the user 110. If a determination is made that the user 110 is granted access to the report object selected by the user 110, then processing proceeds to steps 622 and 624, which are described in greater detail above with reference to steps 526 and 528, respectively.

If, in step 632, a determination is made that the user 110 is not allowed access to the report object selected by the user 110, then access is denied and processing returns to step 212 of FIG. 2.

Figure 7:
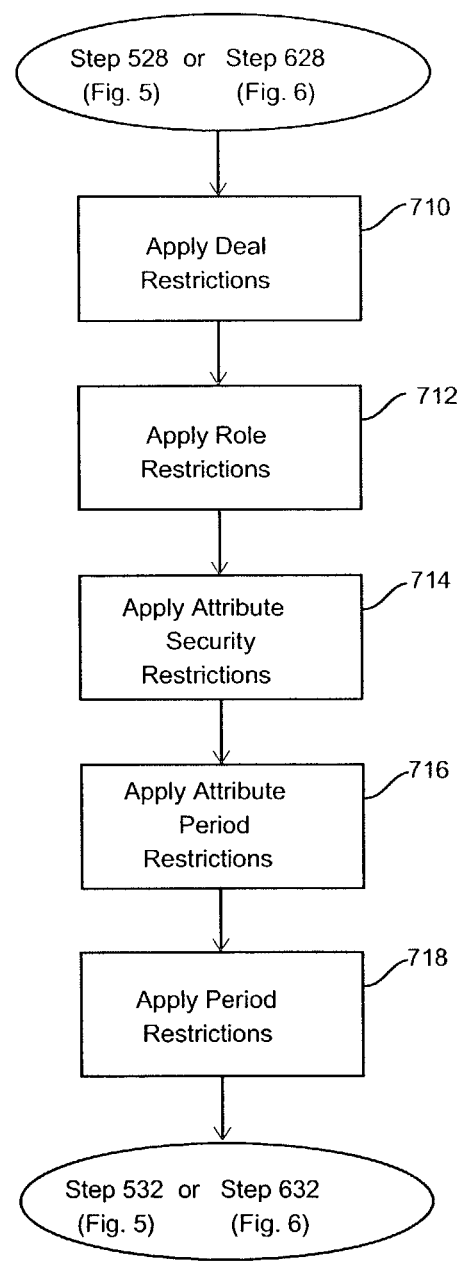
FIG. 7 is a data flow diagram depicting steps that may be performed to grant a user access to a file in accordance with one embodiment of the present invention.

FIG. 7 is a data flow diagram depicting steps that may be performed to validate a report object in accordance to an embodiment of the present invention. Specifically, FIG. 7 is a data flow diagram depicting steps to determine whether or not access to a report should be granted to a user as described above with reference to step 534 of FIG. 5 and step 630 of FIG. 6. Accordingly, after the custom report is determined in step 532 of FIG. 5, processing proceeds to step 534 of FIG. 5, the details of which are depicted by steps 710-718 of FIG. 7. Similarly, after the ad hoc report is determined in step 628 of FIG. 6, processing proceeds to step 630 of FIG. 6, the details of which are depicted by steps 710-718 of FIG. 7.

Processing begins in step 710, wherein deal restrictions are applied. Preferably, a user 110 is only granted access to information regarding transaction or portfolio in which the user 110 is involved. Thus, step 710 performs a query to verify that the user 110 was involved in the selected transaction or portfolio. Preferably, a query is performed on the information database to determine whether or not the user 110 was involved in the transaction corresponding to the selected transaction or portfolio.

Processing proceeds to step 712, wherein role restrictions are applied. Preferably, the reporting system 100 is configured to restrict access to specific attributes depending on the role of a user in a transaction. For example, a trustee may have access to attributes that an investor does not, and an investor may have access to attributes that a broker does not. Accordingly, the report object is evaluated to verify that users of the role corresponding to the role of the user is allowed access to the attributes contained in the report objects. Additionally, a user may have different roles in different transactions, i.e., the user may be allowed access to one attribute in one transaction, but denied access to the same attribute in a different transaction. Accordingly, it is preferable that the role restriction be applied on a transaction-by-transaction basis.

Next, processing proceeds to step 714, wherein attribute security restrictions are applied. Preferably, the reporting system 100 is configured to allow an administrator to restrict access to individual attributes to specific users. For example, the identity and social security number of an investor may be restricted to the investor. Accordingly, each attribute identified by the report object is checked to verify that the user 110 is granted access.

Processing proceeds to step 716, wherein attribute period restrictions are applied. Preferably, the reporting system 100 is configured to allow an administrator to specify that access be granted to a specific attribute before or after a predetermined date. Moreover, the attribute period restrictions may vary dependent upon the role of a user. Next, in step 718, the period restrictions are applied. Preferably, access to information related to specific transactions are dependent upon when the transaction is released. For example, information related to a specific transaction may not be available to a trustee user until after the transaction data is released.

Preferably, the restrictions discussed above are applied via one or more tables. For example, role restrictions may be applied via a table that identifies which roles are granted access to each attribute. Accordingly, for each attribute selected by the user, the table is accessed to verify the role of the user in the specified transaction is allowed access to the selected attributes. Similarly, the attribute security restrictions are preferably implemented via a table that specifies specific user that may access specific attributes, the attribute period restrictions are preferably implemented via a table that specifies when attributes are accessible to a user or role of a user, and period restrictions are preferably implemented via a table that identifies when each deal is accessible.

Thereafter, processing returns to step 536 of FIG. 5 or step 632 of FIG. 6.

Figure 8:
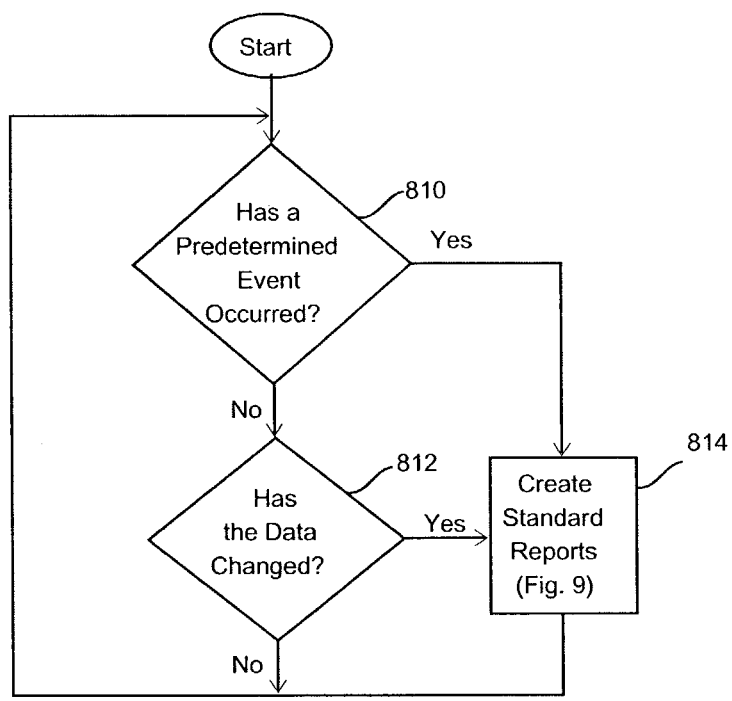
FIG. 8 is a data flow diagram depicting steps that may be performed to determine when to create standard reports in accordance with one embodiment of the present invention.

FIG. 8 is a data flow diagram depicting steps that may be performed by the reporting system 100 to generate standard reports in accordance with an embodiment of the present invention. Processing begins in step 810, wherein a determination is made whether a predetermined event has occurred. Preferably, the reporting system 100 is configured to automatically create the standard reports upon the occurrence of a predetermined event (such as the closing of a transaction, the submittal of an audited report, and the like), after a predetermined amount of time (such as 30 days after closing), and the like. Additionally, some types of reports may only be accessible to a particular type of user after a predetermined amount of time. Accordingly, step 810 determines if a predetermined event has occurred.

If it is determined that a predetermined event has not occurred, then processing proceeds to step 812, wherein a determination is made whether or not the data contained in the information database 118 has been modified. Preferably, the standard reports are produced for each transaction or portfolio. If the data related to any transaction or portfolio has been modified or updated, the reporting system 100 preferably recreates the standard reports associated with the modified data. Accordingly, current standard reports are always available to the user.

If in step 810 it is determined that a predetermined event has occurred or if in step 812 it is determined that the data has been changed, then processing proceeds to step 814, wherein the standard reports are created. The procedure for creating the standard reports is described in greater detail below with reference to FIG. 9.

Figure 9:
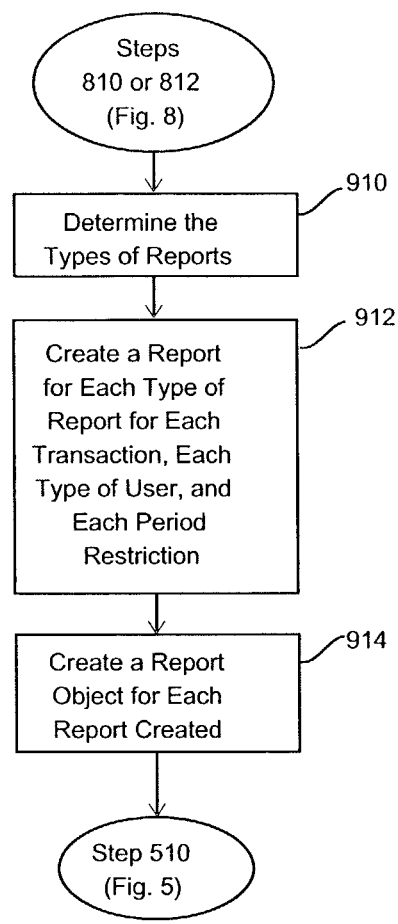
FIG. 9 is a data flow diagram depicting steps that may be performed to create standard reports in accordance with one embodiment of the present invention.

FIG. 9 is a data flow diagram depicting steps for creating a standard report by the report server 116 in accordance to an embodiment of the present invention. Specifically, FIG. 9 is a data flow diagram depicting steps for creating a standard report by the report server 116 as described above with reference to step 814 of FIG. 8. Accordingly, after a determination is made in step 810 that a predetermined event has occurred or a determination is made in step 812 that the data has changed, processing proceeds to step 814, the details of which are depicted by steps 910-914 of FIG. 9.

Processing begins in step 910, wherein the type of standard reports that are to be created are determined. As discussed above, each standard report contains predetermined information. In step 910, the contents of each standard report is determined.

In step 912, a report is created for each report defined in step 910 for each transaction, each type of user, and each period restriction. In step 914, a report object is created and associated to each report. As discussed above, the report object stores the characteristics that must be fulfilled prior to a user being granted access to a report.

Figure 10:
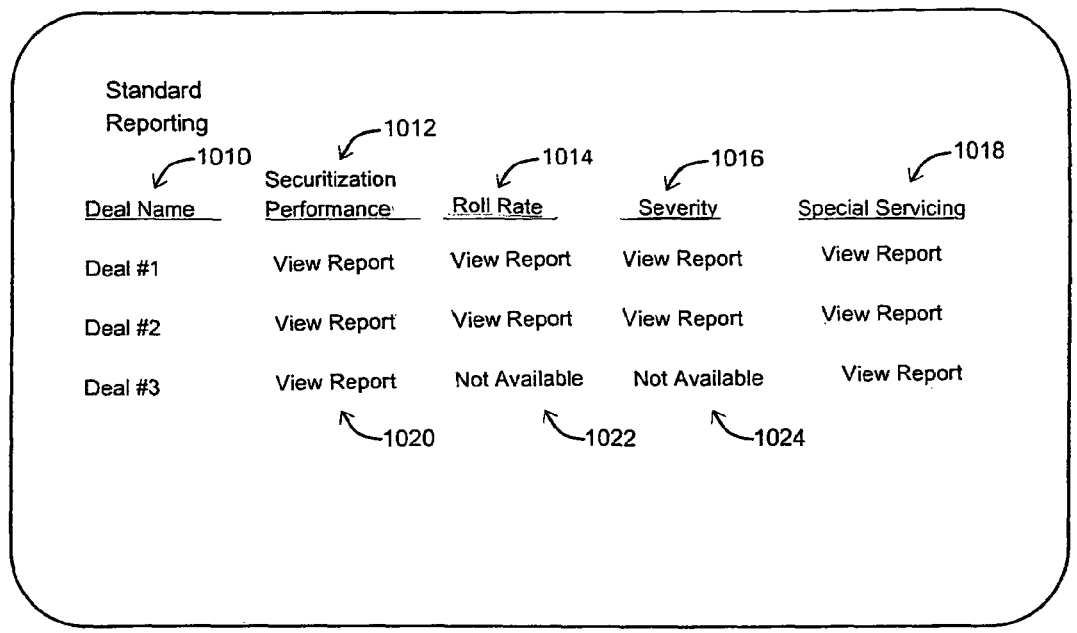
FIG. 10 illustrates a method of presenting standard reports to a user in accordance with one embodiment of the present invention.

FIG. 10 illustrates a screen capture that enables the user to view standard reports in accordance with one embodiment of the present invention. Particularly, FIG. 10 illustrates an example of a user interface that may be utilized in presenting the user a list of standard reports to which the user has access as described above with reference to step 316 of FIG. 3.

Preferably, the list of standard reports is presented to the user as a cross-table, wherein each row indicates the transactions and each column indicates the standard report. The intersection of the transaction row and a standard report column contains either a link to the standard report for the specific transaction or an indication that the standard report is not available to the user.

Referring to FIG. 10, reference numeral 1010 indicates a column listing the transactions or portfolios in which the user is involved. Preferably, the list of transactions or portfolios in which the user is involved is determined as described above with reference to step 310 of FIG. 3.

Reference numeral 1012 indicates a column of securitization performance reports, wherein each row of the column refers to the transaction or portfolio in the corresponding row of the column referred to by reference numeral 1010. Similarly, reference numerals 1014-1018 indicates columns for roll rate, severity, and special servicing standard reports, respectively.

If a particular standard report is available for a particular transaction or portfolio, a link to the corresponding standard report is provided, such as that indicated by reference numeral 1020, labeled "View Report." Otherwise, an indication that the report is not available is displayed, as illustrated by reference numeral 1022 (indicating that a report is not available to the user) and reference numeral 1024 (indicating that a report has not been generated).

Figure 11:
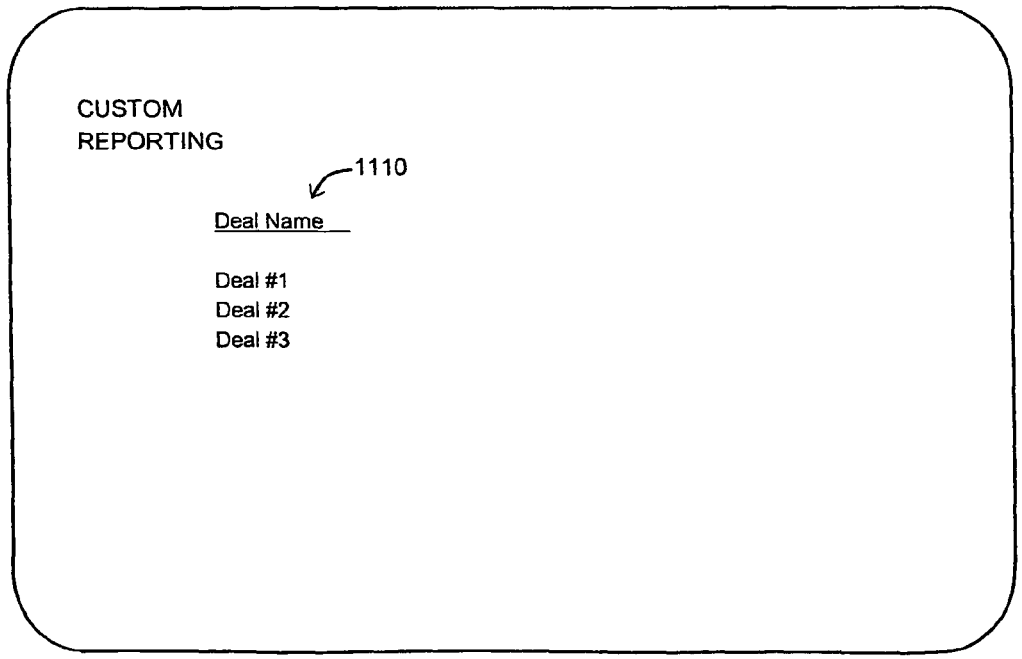
FIGS. 11-13 illustrate a method of presenting custom reports to a user in accordance with one embodiment of the present invention.
Figure 12:
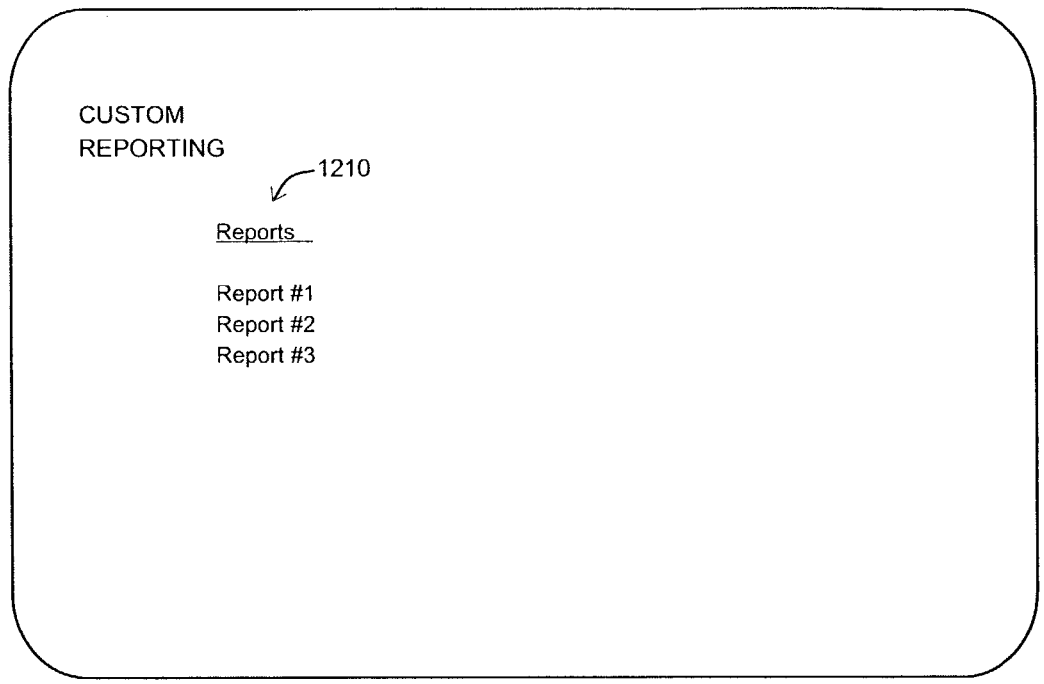
Figure 13:
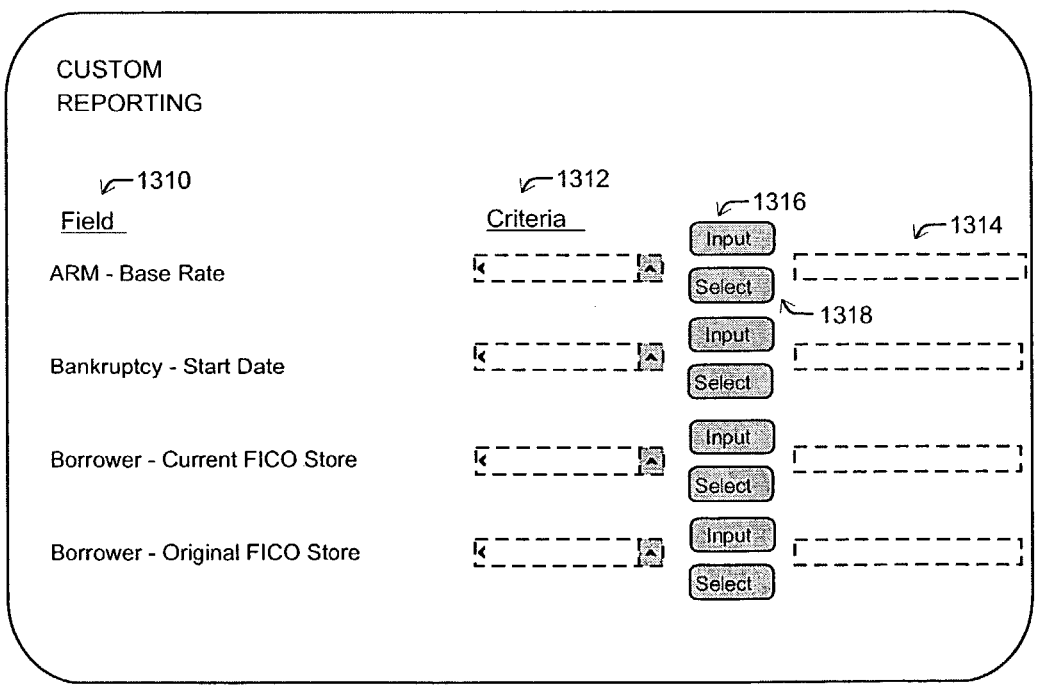

FIGS. 11-13 illustrate screen captures that provides the user the ability to view custom reports in accordance with one embodiment of the present invention. Specifically, FIGS. 11-13 illustrate an example of a user interface that may be utilized to allow a user to create a custom report as described above with reference to FIG. 5.

Referring to FIG. 11, the user is preferably presented a list of transactions in which the user is involved. As discussed above, this list is the result of a query performed on the information database to extract each transaction or portfolio in which the user is involved. Accordingly, reference numeral 1110 indicates a column labeled "Deal Name." Each row of the column refers to a specific deal (i.e., transaction or portfolio) in which the user was involved. The user selects the deal in which the user is interested by double clicking on the corresponding deal name.

Referring to FIG. 12, the user is preferably presented a list of standard reports from which the user may select as a template as described above with reference to step 517 of FIG. 5. Accordingly, reference numeral 1210 indicates a column labeled "Report Name." Each row of the column refers to a standard report for a specific deal (i.e., transaction or portfolio) from which the user may select to use as a template. The user selects the report in which the user is interested by double clicking on the corresponding report name.

FIG. 13 illustrates a screen capture wherein the user is able to select the parameters in which the user is interested in accordance with one embodiment of the present invention. As discussed above with reference to step 518 of FIG. 5, the user is preferably presented a list of attributes. Accordingly, reference numeral 1310 indicates a column labeled "Field" wherein each row represents an attribute that the user may specify criteria that must be met for the data to be included in the custom report. The criteria is preferably selectable via a drop-down box as indicated by reference numeral 1312. Common criteria that are applicable to many attributes include greater than, greater than or equal to, less than, less than or equal to, equal to, and the like. Reference numeral 1314 indicates a box in which a value may be entered to specify a value for the attribute in connection to the selected criteria. Reference numeral 1316 indicates a button labeled "Input," which allows the user to enter the data and to create a new restriction. Reference numeral 1318 indicates a button labeled "Select," which provides the user a discrete set of values from which the user may select. Upon entering the selected restrictions, the reporting system 100 creates the report and presents the report to the user.

Figure 14:
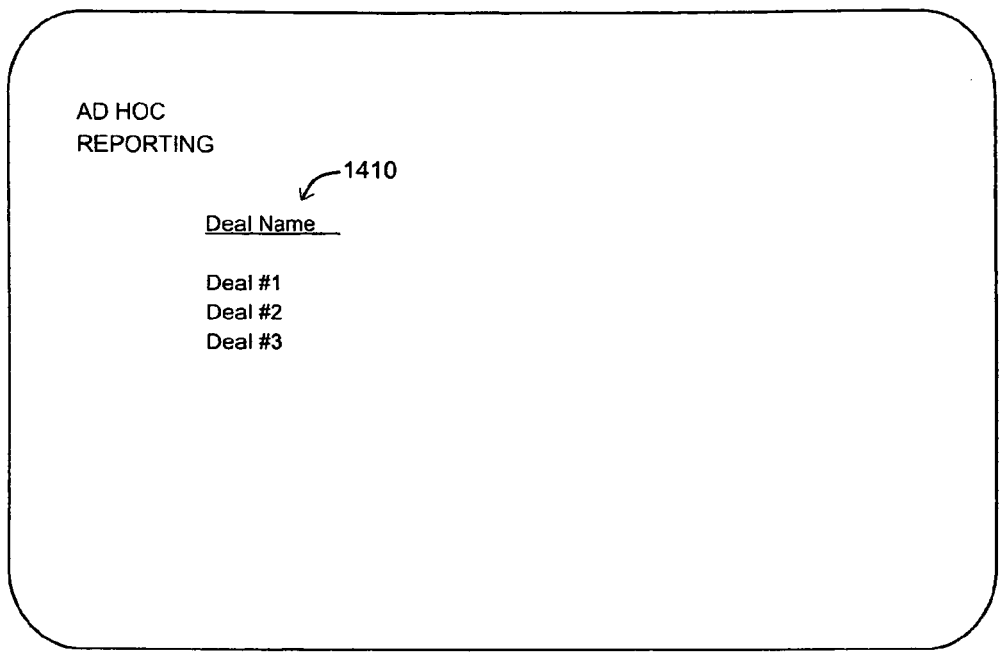
FIGS. 14-16 illustrate a method of presenting ad hoc reports to a user in accordance with one embodiment of the present invention.
Figure 15:
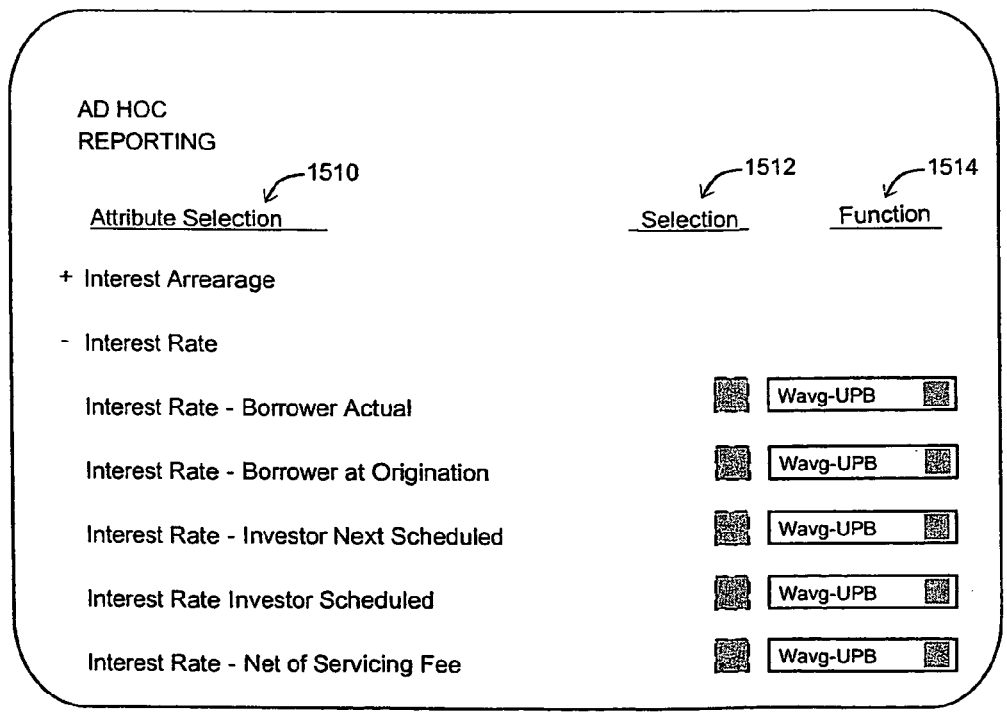
Figure 16:
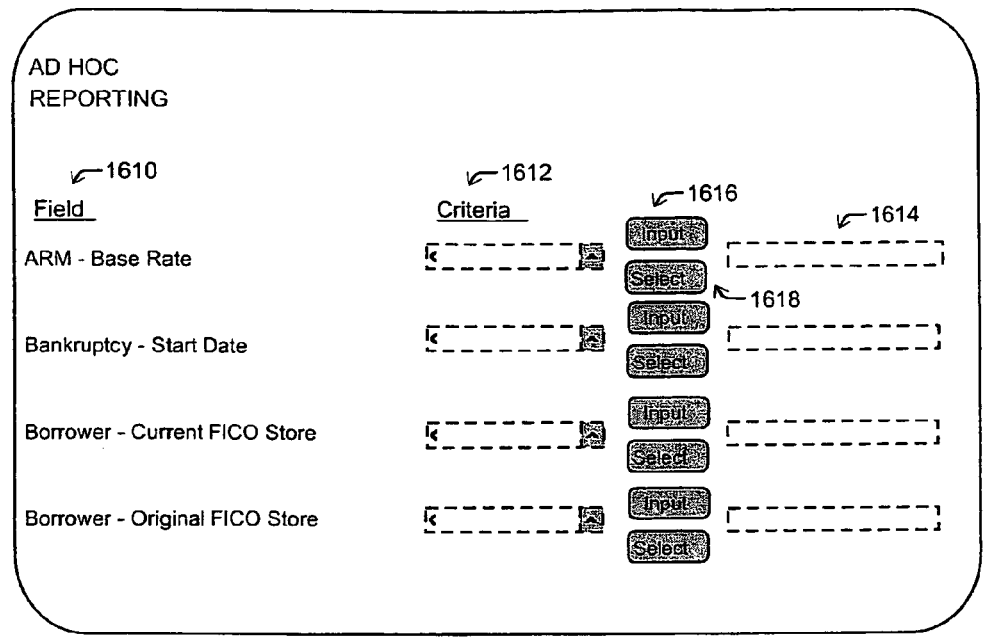

FIGS. 14-16 illustrate screen captures that provides the user the ability to view ad hoc reports in accordance with one embodiment of the present invention. Specifically, FIGS. 14-16 illustrate an example of a user interface that may be utilized to allow a user to create an ad hoc report as described above with reference to FIG. 6.

Referring to FIG. 14, the user is preferably presented a list of transactions in which the user is involved. The list of transactions is determined by performing a query on the information database to extract each transaction or portfolio in which the user is involved. Accordingly, reference numeral 1410 indicates a column labeled "Deal Name", wherein each row of the column refers to a specific deal (i.e., transaction or portfolio) in which the user was involved. The user selects the deal in which the user is interested by double clicking on the corresponding deal name.

FIG. 15 illustrates a screen capture of an attribute selection screen. As discussed above, the user is presented a list of attributes to which the user is granted access. The user is able to select specific attributes and, preferably, select the way the attribute is to be presented. Accordingly, reference numeral 1510 indicates a column labeled "Attribute Selection" in which each row of the column represents an attribute or a group of attributes. Preferably, the attributes are grouped with related attributes. The user is preferably enabled to contract or expand the groups of attributes to easily locate the attributes of interest. Groups of attributes are indicated by a "–" symbol, and an individual attribute is indicated by a "–" symbol. The groups of attributes can be expanded or contracted as desired by clicking on the corresponding "+" symbol or "–" symbol respectively. Preferably, the user selects the selected attributes by checking the corresponding check box, indicated below the heading indicated by reference numeral 1512, labeled "Selection."

Reference numeral 1514 indicates a column labeled "Function." The function option allows the user to create an adhoc group by functions. Preferably, queries are implied group by statements, thus every value returned is either part of the group by clause or have a function associated with the value. For example, the user may want to determine the average weighted by Unpaid Principal. Accordingly, a new function may be entered with specified parameters that will be determined by the user selecting the specified function name from the function drop down, then providing the additional parameter if required from another drop down if needed (or a function could just specify the parameters and not request additional parameters). As a result, it becomes possible for the user to determine the Average Interest Rate by Unpaid Principal Balance without modifying the reporting system 100.

FIG. 16 illustrates a screen capture wherein the user is able to select the parameters in which the user is interested in accordance with one embodiment of the present invention. As discussed above with reference to FIG. 6, the user is preferably presented a list of attributes. Accordingly, reference numeral 1610 indicates a column labeled "Field" wherein each row represents an attribute that the user may specify criteria that must be met for the data to be included in the report. The criteria is preferably selectable via a drop-down box in the column labeled "Criteria" as indicated by reference numeral 1612. Common criteria that are applicable to many attributes include greater than, greater than or equal to, less than, less than or equal to, equal to, and the like. Reference numeral 1614 indicates a box in which a value may be entered to specify a value for the attribute in connection to the selected criteria. Reference numeral 1616 indicates a button labeled "Input," which allows the user to enter the data and to create a new restriction. Reference numeral 1618 indicates a button labeled "Select," which provides the user a discrete set of values from which the user may select. Upon entering the selected restrictions, the reporting system 100 creates the report and presents the report to the user.

Figure 17:
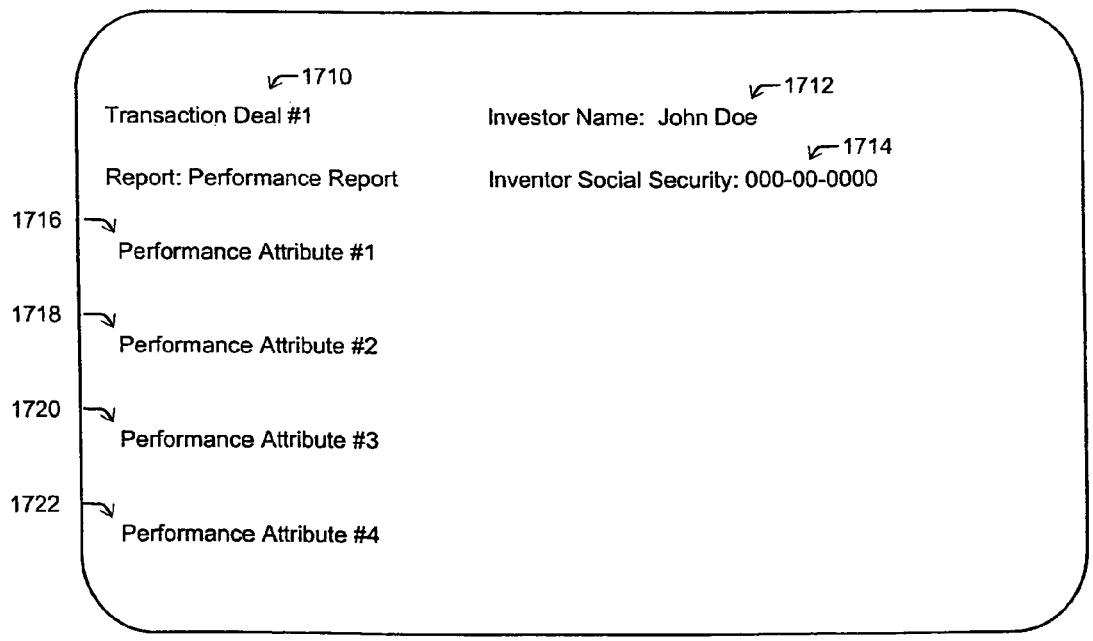
FIGS. 17 and 18 illustrate reports that may be generated in accordance with one embodiment of the present invention.
Figure 18:
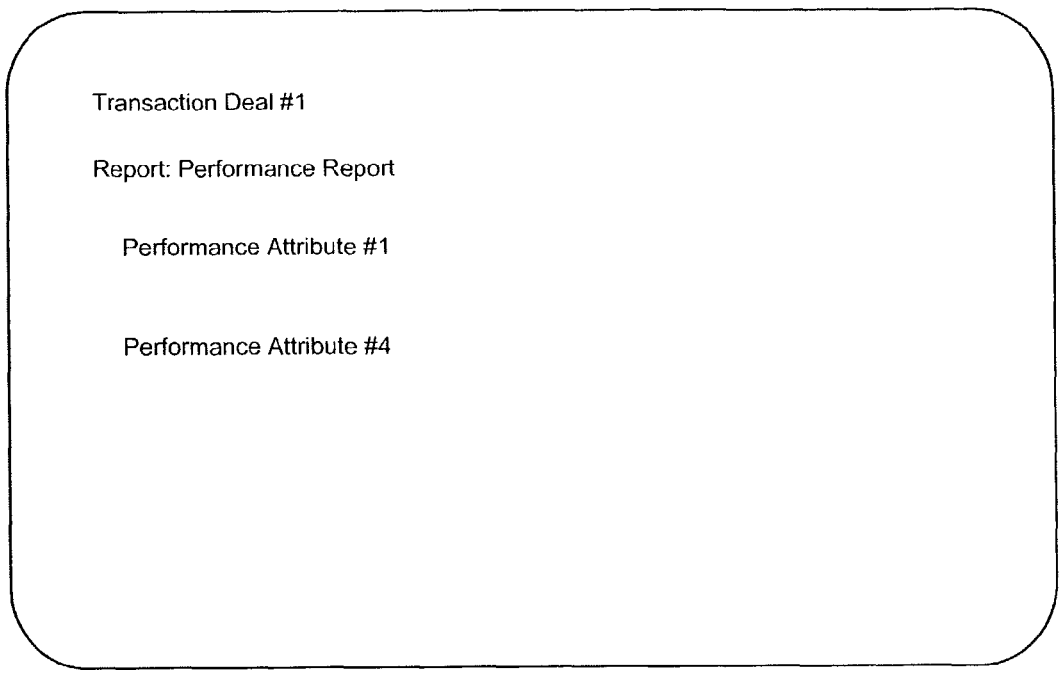

FIGS. 17 and 18 illustrate reports available to an investor and a trustee, respectively, in accordance with one embodiment of the present invention. Generally, FIGS. 17 and 18 illustrate that the reports regarding the same aspect of the same transaction may contain different information for different types of users. FIG. 17 illustrates a performance report that may be available to an investor. The performance report for the investor includes a transaction name 1710, the name of the investor 1712, the social security number of the investor 1714, and performance attributes #1-#4 1716-1722.

In contrast, FIG. 18 illustrates a performance report regarding the same transaction (i.e., "Deal #1") available to a trustee. FIG. 18 does not contain the investor name 1712, investor social security number 1714, and performance attribute #2 (1718) or #3 (1720).

Figure 19:
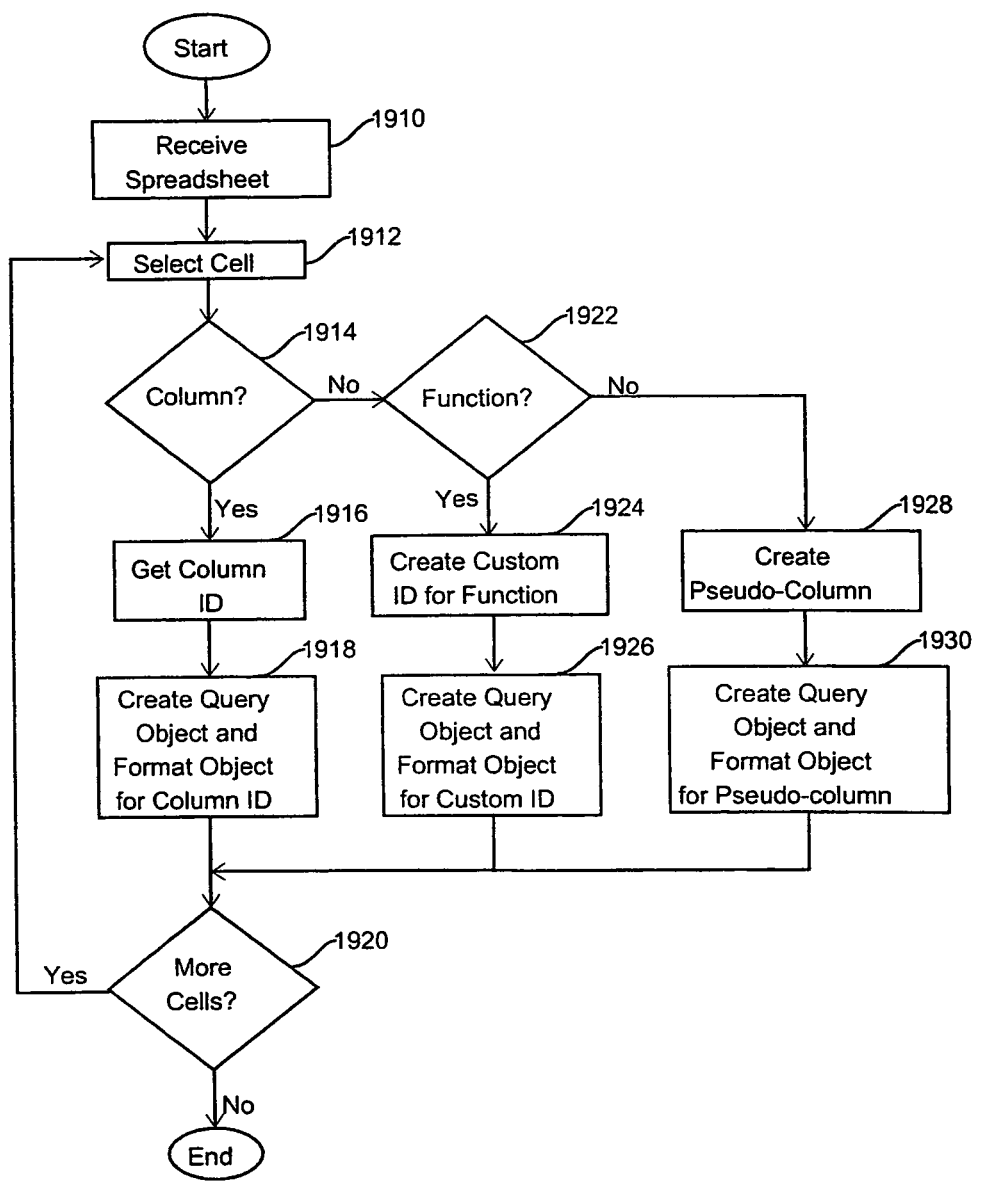
FIG. 19 is a data flow diagram depicting steps that may be performed to create non-tabular reports in accordance with one embodiment of the present invention.

FIG. 19 is a data flow diagram depicting steps that may be performed by the reporting system 100 to generate non-tabular reports in accordance with one embodiment of the present invention. As one of ordinary skill in the art will appreciate, queries generally result in tabular reports, i.e., reports formatted in column and rows. Often times, however, a user desires a report in a non-tabular format. Accordingly, FIG. 19 depicts steps that may be performed to create non-tabular reports.

Processing begins in step 1910 wherein a spreadsheet is received from the user 110. Preferably, the user 110 creates a spreadsheet utilizing a standard spreadsheet program, such as MS Excel available from Microsoft Corporation. The spreadsheet contains an indication of the requested information, the headings, and the desired format. Next in step 1912, a cell of the spreadsheet is selected for processing.

In step 1914, a determination is made whether or not the selected cell represents a column of data. Preferably, a column of data, i.e., a name of an attribute in a table of the information database, is represented by the name of the column in an applications data dictionary. If in step 1914 a determination is made that the selected cell represents a column of data, then processing proceeds to step 1916, wherein the column id corresponding to the column contained in the cell is retrieved. It is preferable that a user be allowed to create the spreadsheet without having knowledge of the specific column ids contained in the information database. Accordingly, in step 1916, the column id associated with the information identified by the selected cell is retrieved.

In step 1918, a query object and a format object are created or modified. Preferably, each report is represented by a query object and a format object. If a query object and a format object have not been created for the corresponding report, then step 1918 creates a new query object and format object. If a query object and a format object have been created for the corresponding report, then step 1918 preferably modifies the existing query object and format object in accordance with the contents of the selected cell.

Preferably, the column id determined in step 1916 is added to an existing query or used to create a new query. Preferably, the query is represented as a query object utilizing standard object-oriented design and programming techniques. Thus, the query object represents a query to extract the requested information, and the attributes of the query object represent the individual columns of data selected by the user 110.

Preferably, the format object is represented as an object utilizing standard object-oriented design and programming techniques. Thus, a format object is created to represent the formatting of a corresponding report. Attributes of the report object represent the location and appearance of the corresponding data in accordance with the format specified in the spreadsheet. For example, the spreadsheet may specify that the date be placed in the upper right corner of the report. Accordingly, the format object will specify the location of the date as the upper right corner and the date field displayed in a particular format, such as month-day-year.

In step 1920, a determination is made whether or not the spreadsheet contains any additional cells to process. If a determination is made that the spreadsheet contains additional cells to process, then processing proceeds to step 1912, the processing of which is described above. If a determination is made that the spreadsheet does not contain additional cells, then processing terminates.

If in step 1914 a determination is made that the selected cell does not represent a column of data, then processing proceeds to step 1922, wherein a determination is made whether or not the selected cell represents a function. Preferably, the user is able to enter in a cell of the spreadsheet a function that is to be performed when the report is created. Functions, such as sum, average, min, max, and the like, provide utilities that allow the user to condense the information into more meaningful data.

In step 1924, a custom column id is created to identify the function. Preferably, a function or formula contained in the selected cell is validated to ensure that the function or formula is a valid SQL expression of a function or formula. If the selected cell contains a valid function or formula, a custom characteristic is created and stored in a table to represent either the formula or the function that is contained in the selected cell. For example, if the user 110 entered "MAX (UNPAID_PRIN_BAL)" in the selected cell, a entry of the column definition is created in a table of the application data dictionary to represent the function.

In step 1926, a query object and a format object are created or modified. As discussed above, each report has a corresponding query object and format object that define the retrieval of the data for the report and the format of the report, respectively. If a query object and a format object have been created for the corresponding report, then step 1926 preferably modifies the existing query object and format object in accordance with the contents of the selected cell. The custom column id created in step 1924 is utilized to create a corresponding query. The function or formula identified by the custom column id is entered as part of the query object.

Processing proceeds to step 1920, wherein a determination is made whether or not the spreadsheet contains additional cells to process. If a determination is made that the spreadsheet contains additional cells to process, then processing proceeds to step 1912, the processing of which is describe above. If a determination is made that the spreadsheet does not contain additional cells, then processing ends.

If in step 1922, a determination is made that the selected cell does not represent a function, then processing proceeds to step 1928, wherein a pseudo-column id is created to identify the string. Preferably, the user 110 specifies column and field headings that are to be displayed in the generated report. The column and field headings are preferably entered into a table and associated with a pseudo column id.

In step 1930, a query object and a format object are created or modified utilizing the pseudo column id. As discussed above, each report has a corresponding query object and format object that defines the retrieval of the data for the report and the format of the report, respectively. If a query object and a format object have been created for the corresponding report, then step 1930 preferably modifies the existing query object and format object in accordance with the contents of the selected cell. Preferably, the pseudo column id will cause the text string contained in the selected cell to be selected from the text string, generating the desired heading.

Processing proceeds to step 1920, wherein a determination is made whether or not the spreadsheet contains additional cells to process. If a determination is made that the spreadsheet contains additional cells to process, then processing proceeds to step 1912, the processing of which is describe above. If a determination is made that the spreadsheet does not contain additional cells, then processing ends.

When the user 110 selects the query to be performed, access by the user 110 to the information is preferably verified prior to presenting the information to the user, and most preferably prior to retrieving the requested information from the database. Preferably, the process described above with reference to FIG. 7 is performed to verify that the user is granted access to the requested information. Restricted information, i.e., information to which the user is not granted access, is preferably removed prior to presenting the information to the user.

FIG. 20 is a spreadsheet that may be used to format a report in accordance with one embodiment of the present invention. Specifically, FIG. 20 is a spreadsheet that may be used to generate a report in accordance with the steps depicted in FIG. 19. Accordingly, cells A1, A2, and C4 contain column ids "Inv_name," "Date," and "Count," respectively, that indicate columns in the information database. Cells B4, B6, C2, E5, and E6 contain label fields "Number Loans," "Total UPB," "Remittance Report," "Beginning Balance," and "Ending Balance," respectively. Preferably, the label fields contain one or more characters that identify that cell as a label field. In FIG. 20, the label fields are identified by single quotes. Cells C6, F5, and F6 each contain a function to determine the sums.

FIG. 21 is a report that may be generated from the spreadsheet illustrated in FIG. 20 in accordance with one embodiment of the present invention. As one of ordinary skill in the art will appreciate, cells containing column ids, such as cells A1, A2, and C4 of FIG. 20, were replaced in the report by the corresponding data. Cells containing labels, such as B4, B6, C2, E5, and E6 of FIG. 20, were presented as labels. Finally, cells containing functions, such as cells C6, F5, and F6 of FIG. 20, were replaced with the result of the corresponding function performed on the specified data fields.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A computer-implemented method for providing user access to investment reports associated with one or more portfolios, the computer comprising at least one processor, the method comprising:
    receiving, via the at least one processor, a user login from a user for accessing a report server;
    granting, via the at least one processor, access to the report server to the user by matching at least one access credential to at least one access criteria;
    determining, via the at least one processor, whether a predetermined event has occurred, wherein, upon the determination that a predetermined event has occurred, a plurality of standard reports are created;
    applying, via the at least one processor, deal restrictions to data in an investment database based on information received from the user, wherein applying deal restrictions comprises:
        determining, via the at least one processor, the one or more portfolios in which the user is involved; and
        identifying, via the at least one processor, a set of standard reports of the plurality of standard reports according to the one or more portfolios in which the user is involved;
    applying, via the at least one processor, role restrictions to the data based on information received from the user;
    applying, via the at least one processor, period restrictions to the data based on data availability, wherein the period restrictions allow access to the data after a predetermined role dependent date;
    presenting, via the at least one processor in communication with a user interface, a list of the set of standard reports accessible to the user, as directed by the role restrictions and the period restrictions;
    accepting, via the at least one processor, from the user a selected report from the list;
    obtaining, via the at least one processor, the selected report;
    validating, via the at least one processor, user access to the selected report by comparing deal restrictions, role restrictions, and period restrictions between the user and the selected report; and
    formatting and outputting, via the at least one processor in communication with the user interface, the selected report to the user.

2. The method of claim 1, wherein the user is selected from a group consisting of an investor and a trustee.

3. The method of claim 1, the method further comprising:
    performing, via the at least one processor, a search of the investment database based on a received user defined query; and
    creating, via the at least one processor, a custom report representing the user-defined query, based on data accessible to the user.

4. The method of claim 1, wherein the predetermined event is a closing of a transaction.

5. The method of claim 1, wherein the predetermined event is a submittal of an audited report.

6. The method of claim 1, wherein the method further comprises determining, via the processor, whether the data in the investment database has been changed, wherein, upon the determination that the data in the investment database has been changed, a plurality of standard reports are created.

7. A computer-implemented method for providing user access to investment reports associated with one or more deal transactions, the computer comprising at least one processor, the method comprising:
    receiving, via the at least one processor, a user login from a user for accessing a report server;
    granting, via the at least one processor, access to the report server to the user by matching at least one access credential to at least one access criteria;
    determining, via the at least one processor, whether a predetermined event has occurred, wherein, upon the determination that a predetermined event has occurred, a plurality of reports are created;
    presenting, via the at least one processor, a list of the plurality of reports accessible to a user;
    accepting, via the at least one processor, from the user a selected report from the list of the plurality of reports;
    validating, via the at least one processor, user access to the selected report, the validating including:
    applying, via the at least one processor, deal restrictions to data in the investment database based on information received from the user, wherein applying deal restrictions comprises:
        determining, via the at least one processor, the one or more deal transactions in which the user is involved; and
        upon the determination of the one or more deal transactions in which the user is involved, eliminating, via the at least one processor, restricted data from the data;
    applying, via the at least one processor, role restrictions to the data based on information received from the user;
    applying, via the at least one processor, attribute security restrictions to the data;
    applying, via the at least one processor, attribute period restrictions to the data; and
    applying, via the at least one processor, period restrictions to the data, wherein the period restrictions allow access to the data after a predetermined role dependent date;
    performing, via the at least one processor, a search of an investment database based on information in the selected report;

obtaining, via the at least one processor, the selected report; and formatting and transmitting, via the at least one processor, the selected report to the user, wherein the selected report contains information from multiple deal transactions.

8. The method of claim 7, wherein the selected report is selected from a group consisting of a custom report and an ad hoc report.

9. The method of claim 7, wherein the user is selected from a group consisting of an investor and a trustee.

10. The method of claim 7, wherein the predetermined event is the closing of a transaction.

11. The method of claim 7, wherein the predetermined event is a submittal of an audited report.

12. The method of claim 7, wherein the method further comprises determining, via the processor, whether the data in the investment database has been changed, wherein, upon the determination that the data in the investment database has been changed, a plurality of standard reports are created.

13. A system for providing user access to investment reports, the system comprising:

means for receiving a user login from a user for accessing a report server;

means for granting access to the report server to the user by matching at least one access credential to at least one access criteria;

means for determining whether a predetermined event has occurred, wherein, upon the determination that a predetermined event has occurred, a plurality of standard reports are created;

means for applying deal restrictions to data in an investment database based on information received from a user, by performing a query on the data and the information received from the user to validate that the user is involved in a transaction to which each of the plurality of standard reports is associated;

means for applying role restrictions to the data based on information received from the user;

means for applying period restrictions to the data based on data availability, wherein the period restrictions allow access to the data after a predetermined role dependent date;

means for presenting a list of the plurality of standard reports accessible to the user, as directed by the deal restrictions, the role restrictions, and the period restrictions;

means for accepting from the user a selected report from the plurality of standard reports;

means for obtaining the selected report;

means for validating user access to the selected report by comparing deal restrictions, role restrictions, and period restrictions between the user and the selected report; and means for formatting and outputting a selected report to the user.

14. The system of claim 13, wherein the user is selected from a group consisting of an investor and a trustee.

15. The system of claim 13, wherein the predetermined event is a closing of a transaction.

16. The system of claim 13, wherein the predetermined event is a submittal of an audited report.

17. The system of claim 13, wherein the system further comprises at least one processor for determining whether the data in the investment database has been changed, wherein, upon the determination that the data in the investment database has been changed, a plurality of standard reports are created.

18. A system for providing user access to investment reports associated with at least one transaction, the system comprising:

means for receiving a user login from a user for accessing a report server;

means for granting access to the report server to the user by matching at least one access credential to at least one access criteria;

means for determining whether a predetermined event has occurred, wherein, upon the determination that a predetermined event has occurred, a plurality of reports are created;

means for applying deal restrictions to data in the investment database based on information received from the user, by eliminating data not associated with the at least one transaction with which the user is involved;

means for applying role restrictions to the data based on information received from the user;

means for applying attribute security restrictions to the data;

means for applying attribute period restrictions to the data;

means for applying period restrictions to the data, wherein the period restrictions allow access to the data after a predetermined role dependent date;

means for presenting a list of the plurality of reports accessible to the user, as directed by the deal restrictions, the role restrictions, the attribute security restrictions, the attribute period restrictions, and the period restrictions;

means for accepting from the user a selected report from the plurality of reports;

means for obtaining the selected report;

means for validating user access to the selected report by comparing the deal restrictions, the role restrictions, the attribute security restrictions, the attribute period restrictions, and the period restrictions between the user and the selected report;

means for performing a search of an investment database based on information in the report; and means for formatting and transmitting the selected report to the user, wherein the selected report contains information from multiple deal transactions.

19. The system of claim 18, wherein the selected report is selected from a group consisting of a custom report and an ad hoc report.

20. The system of claim 18, wherein the user is selected from a group consisting of an investor and a trustee.

* * * * *